(12) United States Patent  
Nagasawa et al.

(10) Patent No.: US 8,337,063 B2
(45) Date of Patent: Dec. 25, 2012

(54) VEHICLE LIGHT

(75) Inventors: Satoshi Nagasawa, Tokyo (JP); Takashi Matsuno, Tokyo (JP); Chikako Yamahana, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 333 days.

(21) Appl. No.: 12/860,665

(22) Filed: Aug. 20, 2010

(65) Prior Publication Data
US 2011/0051453 A1   Mar. 3, 2011

(30) Foreign Application Priority Data

Aug. 25, 2009  (JP) ................................. 2009-194168

(51) Int. Cl.
*B60Q 1/00* (2006.01)
*B60Q 1/04* (2006.01)
*F21S 8/10* (2006.01)

(52) U.S. Cl. ........ 362/547; 362/549; 362/543; 362/545; 362/523; 362/507

(58) Field of Classification Search .............. 362/37–60, 362/459–549
See application file for complete search history.

(56) References Cited

U.S. PATENT DOCUMENTS

| | | | | |
|---|---|---|---|---|
| 6,846,096 B2 * | 1/2005 | Hsu et al. | ....... | 362/294 |
| 2004/0202007 A1 * | 10/2004 | Yagi et al. | ....... | 362/545 |
| 2007/0091632 A1 * | 4/2007 | Glovatsky et al. | ........... | 362/547 |
| 2007/0127257 A1 * | 6/2007 | Erion et al. | .................... | 362/547 |
| 2008/0239743 A1 * | 10/2008 | McFadden et al. | ........... | 362/512 |
| 2009/0080211 A1 * | 3/2009 | Yasuda | ........................ | 362/547 |
| 2009/0303742 A1 * | 12/2009 | Yasuda | ........................ | 362/547 |
| 2010/0253223 A1 * | 10/2010 | Inoue et al. | ..................... | 315/82 |
| 2011/0051447 A1 * | 3/2011 | Lee | ............................... | 362/520 |

FOREIGN PATENT DOCUMENTS

JP   2006286395 A  * 10/2006
JP   4270153 B2    3/2009

* cited by examiner

*Primary Examiner* — Mariceli Santiago
(74) *Attorney, Agent, or Firm* — Kenealy Vaidya LLP

(57) ABSTRACT

A vehicle light including at least one LED light source unit disposed within a light chamber defined by a lens cover and a housing. The vehicle light can further include, within the light chamber: a heat sink and a plurality of heat dissipation fins; a back plate separated away from the heat sink main body and constituting a part of a duct together with the heat sink, the duct containing the plurality of heat dissipation fins between the heat sink main body and the back plate; an axial fan motor configured to generate an air flow passing through the duct; and a cover member, the housing having an opening used for replacing the axial fan motor with another one, the cover member being detatchably attached to the housing so as to cover the opening of the housing.

28 Claims, 6 Drawing Sheets

VEHICLE LIGHT

This application claims the priority benefit under 35 U.S.C. §119 of Japanese Patent Application No. 2009-194168 filed on Aug. 25, 2009, which is hereby incorporated in its entirety by reference.

TECHNICAL FIELD

The presently disclosed subject matter relates to a vehicle light, and in particular, to a vehicle light that can facilitate the replacement operation of an axial fan motor and the optical axis adjustment of an LED light source unit as well as can simultaneously promote dissipation of heat generated by the powered LED light source unit.

BACKGROUND ART

Conventional known vehicle lights can include a lens cover, a housing, and at least one LED light source unit disposed in a lighting chamber defined by the lens cover and the housing. One example thereof is disclosed in Japanese Patent No. 4270153.

FIG. 1 shows a vehicle light 200, as disclosed in Japanese Patent No. 4270153. The vehicle light 200 can include three LED light source units 210, heat conduction members 220, a heat sink 230 connected to the three LED light source units 210 via the corresponding conduction members 220, a blower fan 250, a lens cover 260, and a housing 270 which can form a light chamber 280 together with the lens cover 260. In this vehicle light 200, an air passage 240 is formed within the space defined by the lens cover 260 and the housing 270. The heat sink 230 and the blower fan 250 are arranged in the air passage 240 at respective appropriate positions.

In this vehicle light 200 configured as described above, the blower fan 250 is contained in the light chamber 280 hermetically sealed and defined by the lens cover 260 and the housing 270, without taking replacement of the blower fan 250 into consideration. Namely, as shown in FIG. 1, the vehicle light 200 does not have a dismountable structure. Accordingly, even if there is a need to replace the blower fan 250 with a new one when the blower fan 250 has been damaged, the replacement operation cannot be done with ease due to the sealed structure(s).

Furthermore, the above vehicle light 200 is intended to be used as a headlight for an automobile, for example, and accordingly, the optical axes of the respective LED light source units 210 are required to be adjusted as a headlight. However, the structure of the headlight 200 is not designed to take such optical axis adjustment into consideration. Accordingly, this prevents adjustment of the optical axes of the LED light source units 210 after assembly of the light.

SUMMARY

The presently disclosed subject matter was devised in view of these and other problems and features and in association with the conventional art. According to an aspect of the presently disclosed subject matter, a vehicle light can facilitate the replacement operation of an axial fan motor, can provide for adjustment of the optical axis of an LED light source unit, and can simultaneously promote dissipation of heat generated by the powered LED light source unit.

According to another aspect of the presently disclosed subject matter, a vehicle light can include: a lens cover; a housing which defines a light chamber together with the lens cover; at least one LED light source unit disposed within the light chamber, the LED light source unit having an optical axis; a heat sink disposed within the light chamber, the heat sink including a heat sink main body to which the LED light source unit is secured and a plurality of heat dissipation fins; a back plate disposed within the light chamber and separated away from the heat sink main body at a certain distance, the back plate constituting a part of a duct together with the heat sink, the duct containing the plurality of heat dissipation fins between the heat sink main body and the back plate; an optical axis adjusting mechanism configured to adjust the optical axis of the LED light source unit by moving the duct; a heat conduction member disposed within the light chamber, the heat conduction member configured to conduct heat generated by the LED light source unit, when turned on, to the heat sink; an axial fan motor disposed within the light chamber, the axial fan motor configured to generate an air flow passing through the duct to circulate the air flow within the light chamber; and a cover member. In this configuration of the vehicle light, the housing can have an opening that can be used for replacing the axial fan motor with another axial fan motor (or other exhausting device). The cover member can be detachably attached to the housing so as to cover the opening of the housing. The axial fan motor can be disposed near the opening used for replacing the axial fan motor within the light chamber, and at a position where the axial fan motor does not interfere with the duct moved by the optical adjusting mechanism.

In the vehicle light configured as above, the housing can have an opening used for replacing the axial fan motor, and the axial fan motor can be disposed near the opening within the light chamber. When the cover member is removed, the opening can be exposed to the outside. Accordingly, the axial fan motor can be replaced through the opening of the housing when the axial fan motor has become defective, for example.

In the vehicle light configured as described above, the optical axis adjusting mechanism can move at least a portion of the duct. This configuration can precisely and easily adjust the optical axis of the LED light source unit. Furthermore, the axial fan motor can be disposed at a position where the axial fan motor does not interfere with the duct that can be moved by the optical axis adjusting mechanism. Accordingly, the optical axis of the LED light source unit can be adjusted.

In the vehicle light configured as described above, the duct can be formed between the heat sink main body and the back plate, and the duct can be configured to contain a plurality heat dissipation fins. An air flow generated by the axial fan motor can pass through the inside of the duct. When the activated LED light source generates heat, the heat can be propagated through the heat conduction member to the heat sink main body, thereby promoting effective heat dissipation.

The vehicle light configured as described above can further include a base plate disposed within the light chamber and having a first surface and a second surface. The LED light source unit can be secured to the first surface, the heat sink being secured to the second surface.

According to the above configuration, the LED light source unit can be secured more firmly.

As described above, a vehicle light according to an aspect of the presently disclosed subject matter can facilitate the replacement operation of an axial fan motor or other exhaust device, and can facilitate easier adjustment of the optical axis of an LED light source unit. The vehicle light can also be configured to promote dissipation of heat generated by the powered LED light source unit.

In the vehicle light configured as described above, the cover member can include a control circuit configured to control the LED light source unit. In this case, a compact vehicle light can be provided.

In the vehicle light configured as described above, the opening for use in replacing an axial fan motor can be provided in a bottom area of the housing, and the axial fan motor can be attached to the cover member so that the axial fan motor creates an upward air flow from below the duct. Alternatively, the axial fan motor can be attached to the cover member so that the axial fan motor creates a horizontal air flow from below the duct. In this case, the back plate can have an extension from a lower end thereof, and the extension can be configured to change the horizontal air flow to a vertical air flow passing through the duct. In these cases, the replacement of the axial fan motor can be facilitated while an effective cooling effect can be attained.

In another exemplary embodiment of a vehicle light configured according to an aspect of the disclosed subject matter, the back plate can have an extension from a lower end thereof, the opening for use in replacing an axial fan motor can be provided in a bottom area of the housing, and the axial fan motor can be attached to the extension of the back plate near the opening so that the axial fan motor creates an upward air flow passing through the duct. In this case, a more effective cooling effect can be attained.

In still another exemplary embodiment of a vehicle light configured in accordance with an aspect of the disclosed subject matter, the opening for use in replacing an axial fan motor can be provided in a top area of the housing, and the axial fan motor can be attached to the cover member so that the axial fan motor creates a horizontal air flow for sucking air from within the duct. In this case, the replacement of the axial fan motor can be facilitated while an effective cooling effect can be attained.

In any of the vehicle lights configured as described above, the heat conduction member may be a heat pipe. In this case, the heat conduction from the LED light source unit to the heat sink can be reliably achieved.

As described above, a vehicle light made in accordance with principles of the presently disclosed subject matter and as shown by the above various exemplary embodiments can facilitate the replacement operation of an axial fan motor (or other exhaust device) and can facilitate optical axis adjustment of an LED light source unit, and can simultaneously promote dissipation of heat generated by the powered LED light source unit.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to vehicle lights according to one aspect of the presently disclosed subject matter with reference to the accompanying drawings in accordance with exemplary embodiments.

Figure 1:
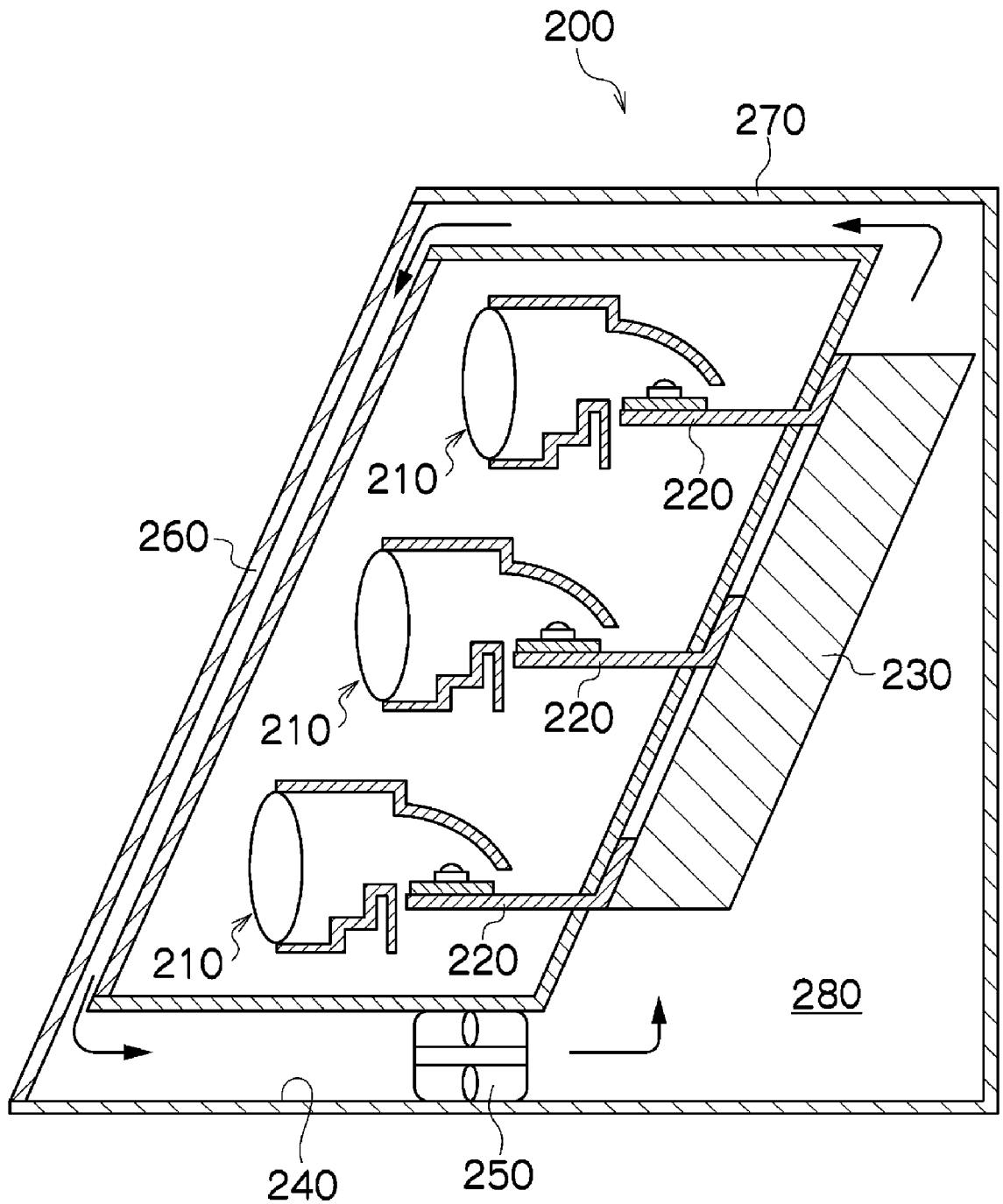
FIG. 1 is a longitudinal cross-sectional view illustrating a conventional vehicle light.
Figure 2:
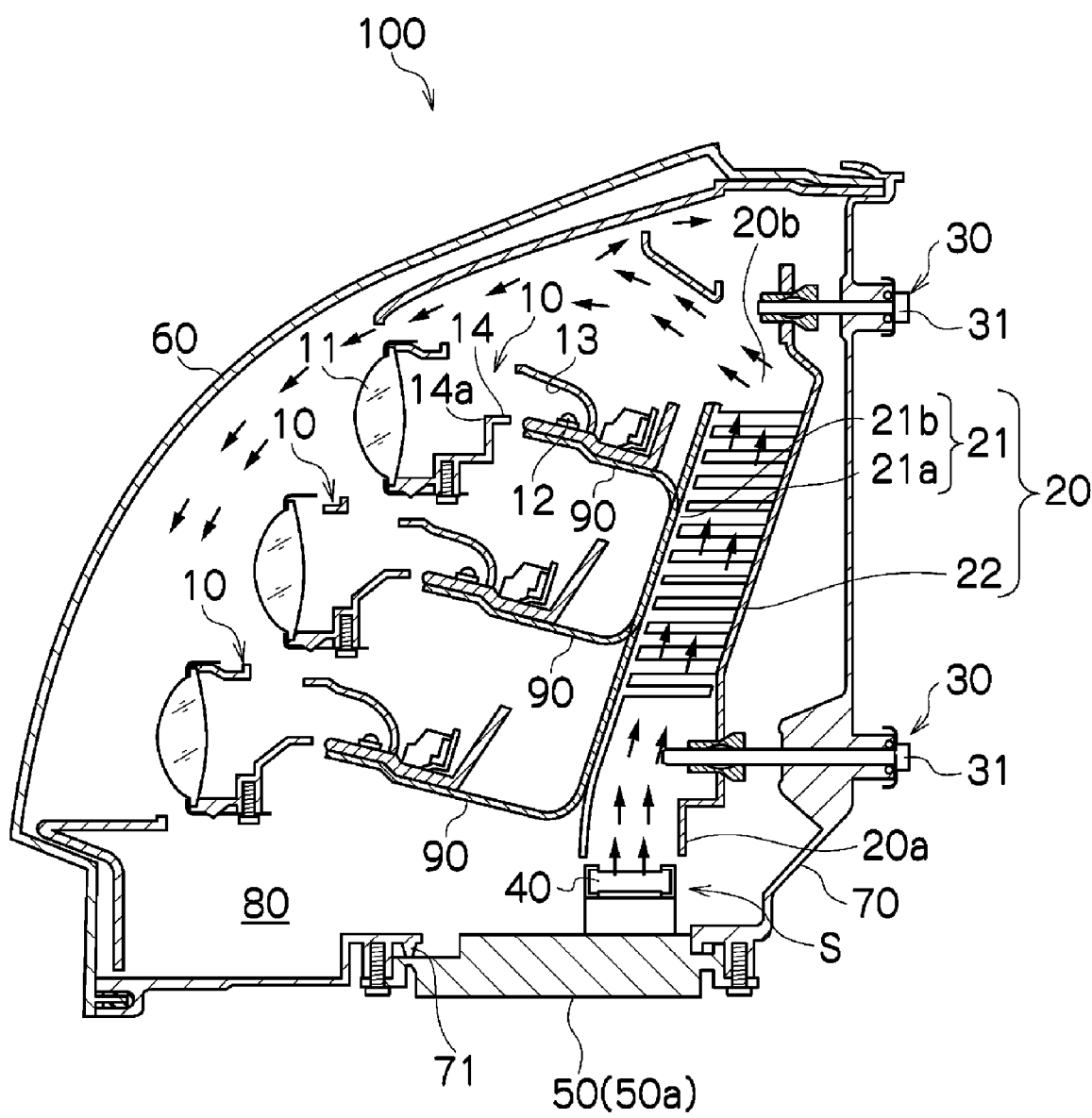
FIG. 2 is a longitudinal cross-sectional view illustrating a vehicle light made in accordance with principles of the presently disclosed subject matter.

The vehicle light 100 of the exemplary embodiment of FIG. 2 can be configured as a vehicle headlight such as a headlight for an automobile. As shown in FIG. 2, the vehicle light 100 can include at least one LED light source unit 10 (three LED light source units 10 are exemplified in FIG. 2), a duct 20, an optical axis adjusting mechanism 30, an axial fan motor 40, a cover member 50, and the like.

Furthermore, the vehicle light 100 can include a lens cover 60 and a housing 70 which constitutes a light chamber 80 together with the lens cover 60. The LED light source units 10 can be disposed within the light chamber 80 in the vertical direction, as shown in FIG. 2.

Each of the LED light source units 10 can include a projection lens 11 disposed in the forward direction of the vehicle light 100 (when installed in a vehicle body, not-shown), an LED light source 12 disposed in the rearward direction of the vehicle light 100, a reflecting surface 13 disposed in the light projection direction of the LED light source 12, a shading member 14 disposed between the projection lens 11 and the LED light source 12.

The projection lens 11 can be a spherical condenser lens having a focal point on the LED light source 12 side. The LED light source 12 can be a semiconductor light source including one or a plurality of LED chips that are packaged. As shown in FIG. 2, the LED light source 12 can be disposed so that the light projection direction of the LED light source 12 is directed upward (in the shown example, the light projection direction of the LED light source 12 is directed upward and slightly rearward). The cover member 50 can include an LED control circuit 50a which is electrically connected to the respective LED light sources 12, so that the LED light sources 12 can be lit in accordance with control by the LED control circuit 50a.

The reflecting surface 13 can be a revolved elliptic reflecting surface having a first focal point at or near the LED light source 12 and a second focal point at or near the front edge 14a of the shading member 14. The reflecting surface 13 can be configured so as to allow the portion of light emitted from the LED light source 12 that reaches the reflecting surface 13 to be condensed near the front edge 14a of the shading member 14 and pass the projection lens 11, thereby forming an appropriate light distribution pattern (not shown) having a cut-off line defined by the front edge 14a of the shading member 14. The shading member 14 can be configured to shield part of the light reflected from the reflecting surface 13 in order to form a cut-off line in a light distribution pattern. As shown in FIG. 2, the shading member 14 can be disposed between the projection lens 11 and the LED light source 12 so that the front edge 14a is positioned at or near the focal point of the projection lens 11.

The duct 20 can be a tubular passage configured to include a heat sink 21 arranged in the front side thereof and a back plate 22 arranged in the rear side thereof, as shown in FIG. 2. The duct 20 can be disposed so as to extend vertically. In the exemplary embodiment as illustrated in FIG. 2, the duct 20 is disposed so as to extend vertically and be slightly inclined rearward. Further, the heat sink 21 can have heat radiation fins 21a that can be configured as corrugated fins, for example. Please note that the drawing schematically illustrates the respective parts, and accordingly, an air flow can pass through the duct 20 from its lower portion to its upper portion although the duct appears to be clogged by the fins 21a. In other words, the fins 21a are configured to allow air flow to pass through the gap(s) formed therebetween so that the air can flow vertically.

The heat sink 21 can include a heat sink main body 21b where the LED light source units 10 are secured, and a plurality of heat radiation fins 21a which are in a thin plate shape and can extend vertically. Alternatively, the fins 21a can take a corrugated fin shape. The back plate 22 can be disposed away from the heat sink main body 21b at a certain or specific distance, so that the heat sink 21 (heat sink main body 21b) and the back plate 22 can form the duct 20, in which the plurality of heat radiation fins 21a are contained. It should be noted that the certain or specific distance between the back plate 22 and the heat sink main body 21b can vary along the length of the duct, while the duct 20 can include a longitudinal axis along which air can flow.

Figure 3:
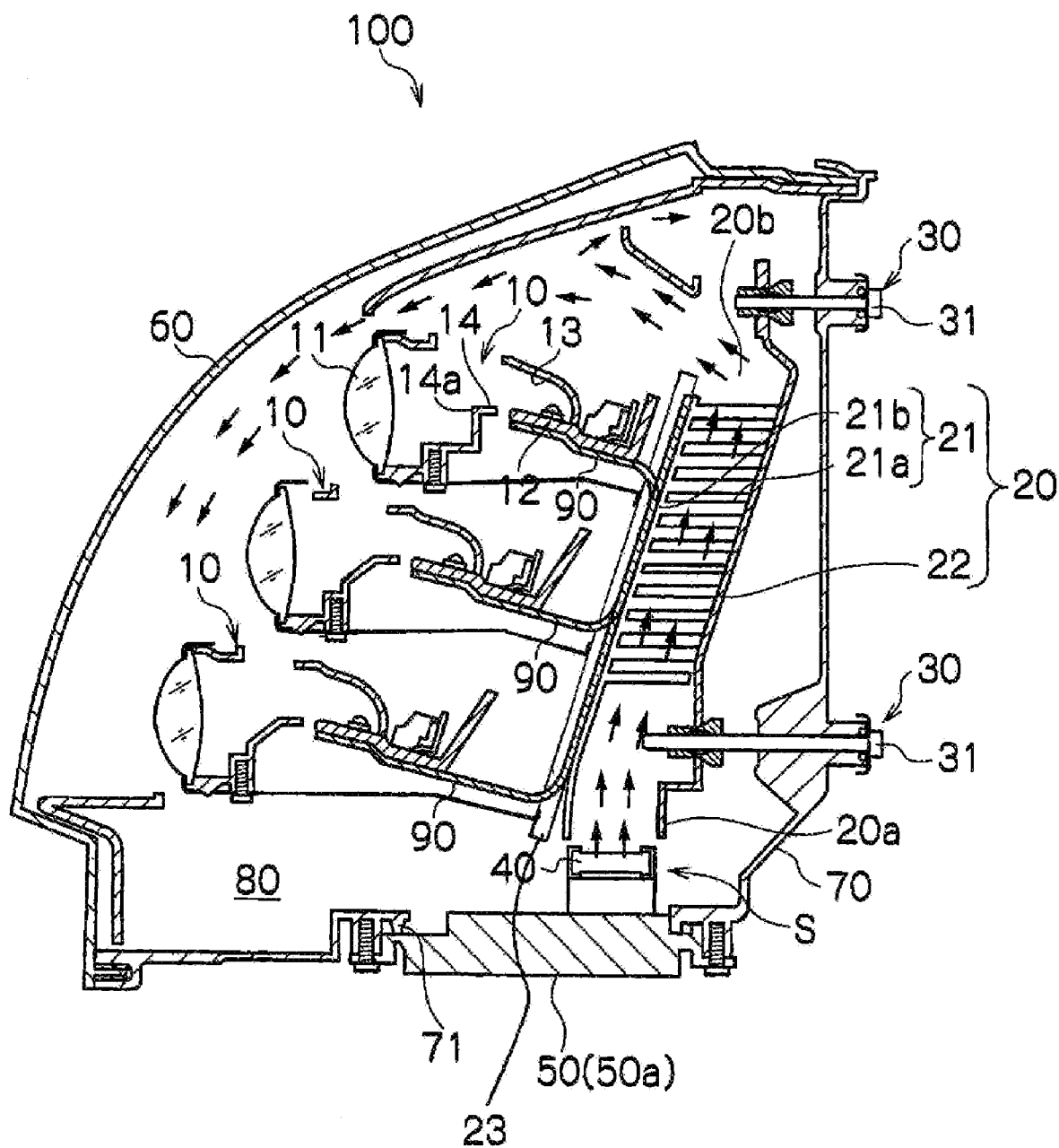
FIG. 3 is a longitudinal cross-sectional view illustrating a modified example of the vehicle light of FIG. 2.

In the present exemplary embodiment, the heat sink main body 21b also serves as a base plate for the LED light source units. The duct 20 can include a passage formed between the corrugated heat radiation fins 21a and the heat sink main body 21b and/or a passage formed between the corrugated heat radiation fins 21a and the back plate 22. Alternatively, in order to facilitate the assembly process and/or ensure greater strength for the structure, the duct 20 can be formed by a combination of a heat sink 21, a separate base plate 23, and a back plate 22 or a combination of a heat sink 21 as shown in FIG. 3, a separate base plate 23, a back plate 22, and a separate member (not shown).

In this configuration, the heat radiation fins 21a of the heat sink 21 can protrude into the inside of the duct 20, thereby being cooled by the air flow flowing through the duct 20. The heat radiation fins 21a can take a corrugated fin shape or simple plate shape as well as other well-known heat radiation assembly configurations.

The housing 70 can have an opening 71 for use in replacing an axial fan motor located in a bottom portion of the housing 70. The opening 71 can be closed by the cover member 50 during use. In order to ensure an installing space S for the axial fan motor 40, the lower end 20a of the duct 20 can be arranged to face towards the opening 71 but to be spaced away from the opening 71 by a certain distance.

The three LED light source units 10 can be connected (secured) to the duct 20 (in particular, the heat sink main body 21b) with a heat conduction member, for example, heat pipes 90. Accordingly, when the LED light source units 10 including the LED light sources 12 are turned on and generate heat, the heat pipes 90 can transfer the generated heat to the heat radiation fins 21a through the heat sink main body 21b, thereby allowing the transferred heat to be radiated into the space within the duct 20.

The back plate 22 of the duct 20 can be provided with the well-known optical axis adjusting mechanism 30. The optical axis adjusting mechanism 30 can include an optical axis adjusting screw 31. As shown in FIG. 2, the optical axis adjusting mechanism 30 can be disposed near either ends of the back plate 22 in the vertical direction. Namely, the optical axis adjusting screws 31 can be inserted into openings formed in the housing 70 and screwed into the back plate 22 at its upper end portion and lower end portion. Then, the adjustment of the respective screwing depths of the optical axis adjusting screws 31 can move the back plate 22, namely, can move the duct 20 including the heat sink main body 21b on which the LED light source units 10 are secured. Accordingly, the optical axes of the LED light source units 10 can be finely adjusted.

The axial fan motor 40 according to one aspect of the presently disclosed subject matter can be a motor-built-in fan. In order to allow the axial fan motor 40 to be replaceable with the use of the opening 71 and so as not to hinder the movement of the duct 20 (including the heat sink main body 20b and the back plate 22), the axial fan motor 40 can be disposed within the light chamber 80 and near the opening 71. At the same time, the axial fan motor 40 should be disposed at a position where the duct 20 moved by the optical axis adjusting mechanism 30 is not present (namely, out of the movable range of the duct 20).

For example, the axial fan motor 40 can be attached to the cover member 50. When the cover member 50 is attached to the housing 70 to cover the opening 71, the axial fan motor 40 installed on the cover member 50 as shown in FIG. 2 can be disposed just below the lower edge 20a of the duct 20, so that the axial fan motor 40 can deliver an air flow vertically upward.

The axial fan motor 40 can be activated when the LED light sources 12 are turned on. The axial fan motor 40 can be kept activated after the LED light sources 12 are turned off for removing any residual heat. The air flow generated by the axial fan motor 40 can pass through the duct 20 containing the plurality of the heat radiation fins 21a, and then can circulate within the light chamber 80, as shown by arrows in FIG. 2. Accordingly, the heat that is generated by the three activated LED light source units 10 and which is transferred to the heat sink main body 21b of the duct and in turn to the plurality of heat radiation fins 21a can be efficiently radiated.

The cover member 50 can include the LED control circuit 50a for controlling the LED light source units 10 including the LED light sources 12. The cover member 50 can be detachably attached to the housing 70 by well-known fixing means, for example, screws, to cover the opening 71.

As described above, in the vehicle lamp 100 of the present exemplary embodiment, the housing 70 can have the opening 71 for use in replacing an axial fan motor, and the axial fan motor 40 can be disposed in the lamp chamber 80 near the opening 71 (see FIG. 2). Accordingly, if the axial fan motor 40 is damaged due to service life or the like, the cover member 50 can be removed to expose the opening 71 for use in replacing an axial fan motor, and thereby the axial fan motor 40 can be replaced with a new device.

Furthermore, the vehicle light 100 of the present exemplary embodiment can be configured such that the movement of the duct 20 by the optical axis adjusting mechanism 30, which is connected to the back plate 22 of the duct 20, can achieve optical axis adjustment of the LED light source units 10. In addition to this, the vehicle light 100 can be configured such that the axial fan motor 40 can be disposed at a position where the duct 20 that is moved by the optical axis adjusting mechanism 30 does not interfere with the axial fan motor 40 (namely, out of the movable range of the duct 20). Accordingly, the optical axis adjustment of the LED light source units 10 can be achieved.

Furthermore, the vehicle light 100 of the present exemplary embodiment can have the duct 20 that is defined by the heat sink main body 21b and the back plate 22 and contains the plurality of heat radiation fins 21a and can be configured such that the air flow generated by the axial fan motor 40 can pass through the duct 20. Accordingly, the heat that is generated by the three LED light source units 10 when activated is transferred to the heat sink main body 21b of the duct 20 through the heat pipe 90 which serves as a heat conduction member, and in turn to the plurality of heat radiation fins 21a and can then be efficiently radiated.

As described above, the vehicle light 100 of the present exemplary embodiment and according to one aspect of the presently disclosed subject matter can facilitate the replacement operation of the axial fan motor 40 (or other exhaust device) and can facilitate the optical axis adjustment of the LED light source units 10 as well as simultaneously promoting dissipation of heat generated by the powered LED light source units 10.

Next, a description will be given of several modified exemplary embodiments of the disclosed subject matter.

Figure 4:
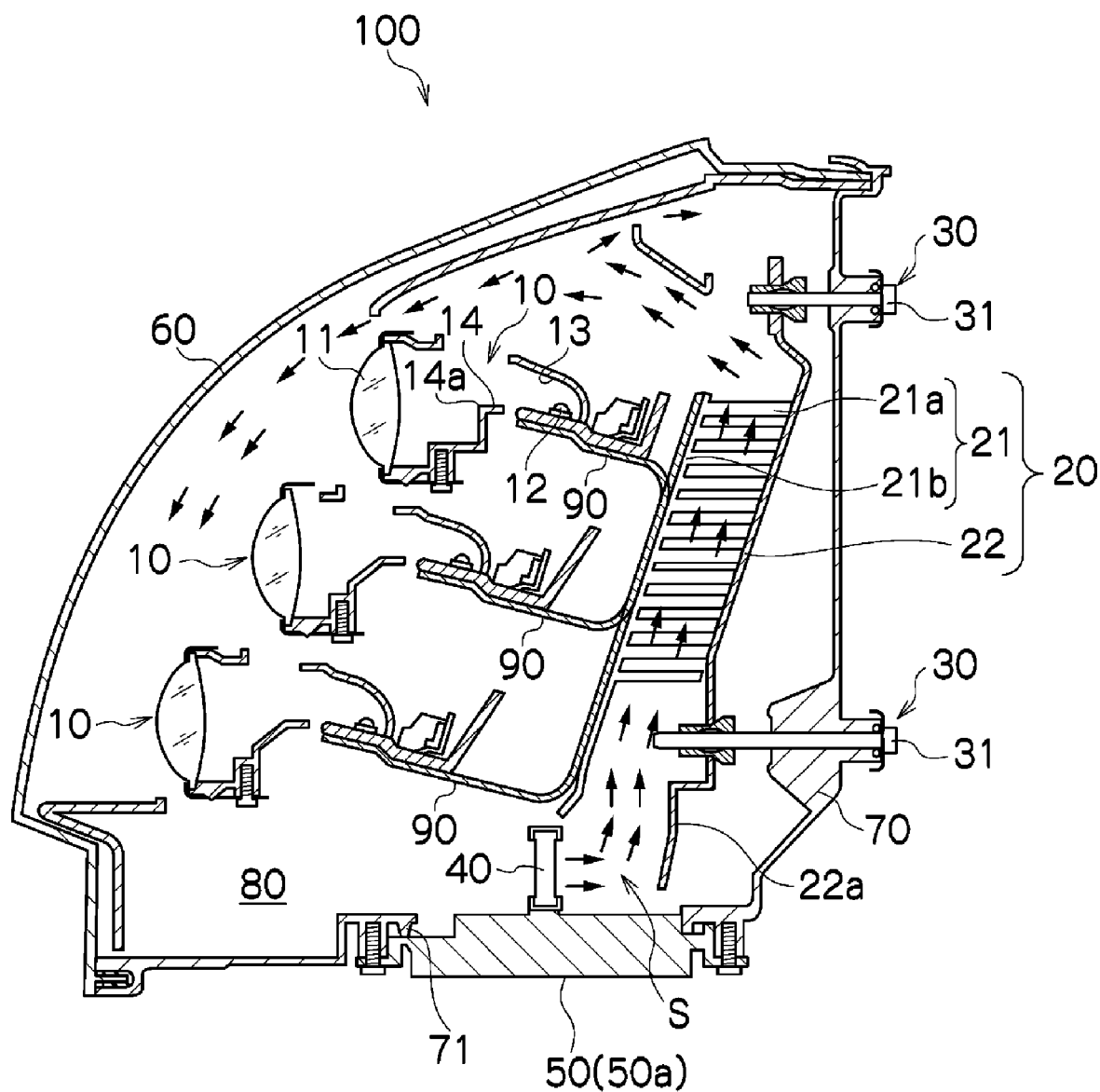
FIG. 4 is a longitudinal cross-sectional view illustrating a modified example of the vehicle light of FIG. 2.

In the above exemplary embodiment, the axial fan motor 40 can be attached to the cover member 50 so that the axial fan motor 40 can create air flow that extends vertically upward when the cover member 50 is attached to the housing 70 to cover the opening 71 for use in replacing an axial fan motor. However, the presently disclosed subject matter is not limit to this exemplary embodiment. For example, as shown in FIG. 4, the axial fan motor 40 can be attached to the cover member 50 such that the axial fan motor 40 can create an air flow that extends horizontally rearward (in the rear direction of the vehicle body) while the cover member 50 can cover the opening 71. In this case, in order to effectively introduce the air flow from the axial fan motor 40 into the duct 20, the back plate 22 can have an extension from its lower end downward (or another separate member can be appropriately arranged) to serve as a converting part 22a. In this way, the air flow can collide with the converting part 22a, namely the extended lower end of the back plate 22 (or the separate member), thereby facilitating a change of direction of the air flow. FIG. 4 illustrates a modified exemplary embodiment wherein the lower end of the back plate 22 is configured to extend downward, thereby serving as the converting part 22a for changing the direction of the air flow.

Figure 5:
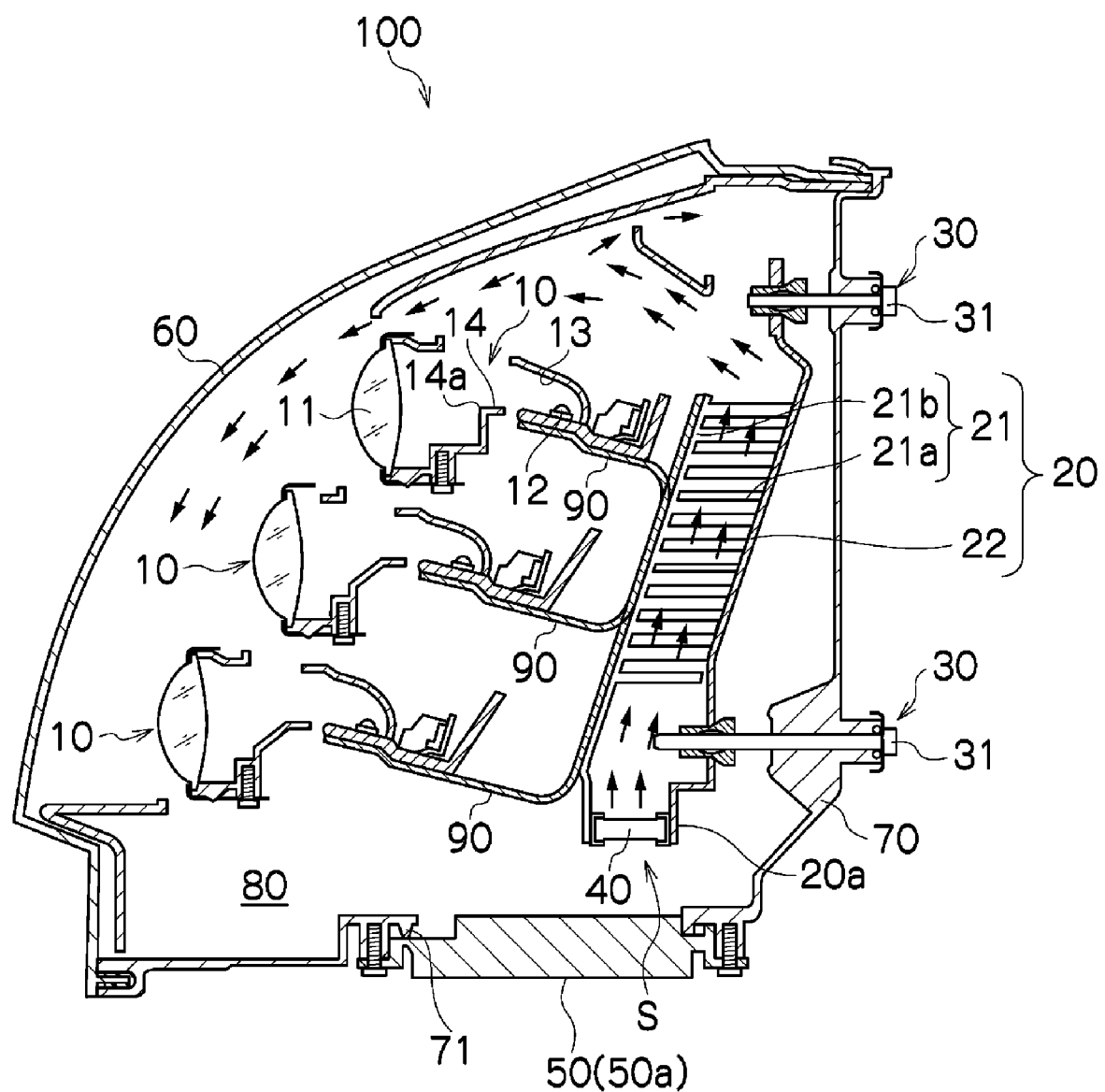
FIG. 5 is a longitudinal cross-sectional view illustrating another modified example of the vehicle light of FIG. 2.

The axial fan motor 40 can be attached not to the cover member 50, but to the lower end 22a of the duct 20 (the back plate 22) in an alternative embodiment as shown in FIG. 5. In this configuration, even when the duct 20 is moved during the optical axis adjustment of the LED light source units 10, the positional relationship between the lower end 20a and the axial fan motor 40 is not changed, thereby keeping a certain degree of the heat dissipation effect more stable.

In the above exemplary embodiment, the duct 20 can extend vertically, but the presently disclosed subject matter is not limited to this exemplary embodiment. For example, the duct 20 can extend in a direction other than the vertical direction, namely, in the inclined direction or horizontal direction.

Figure 6:
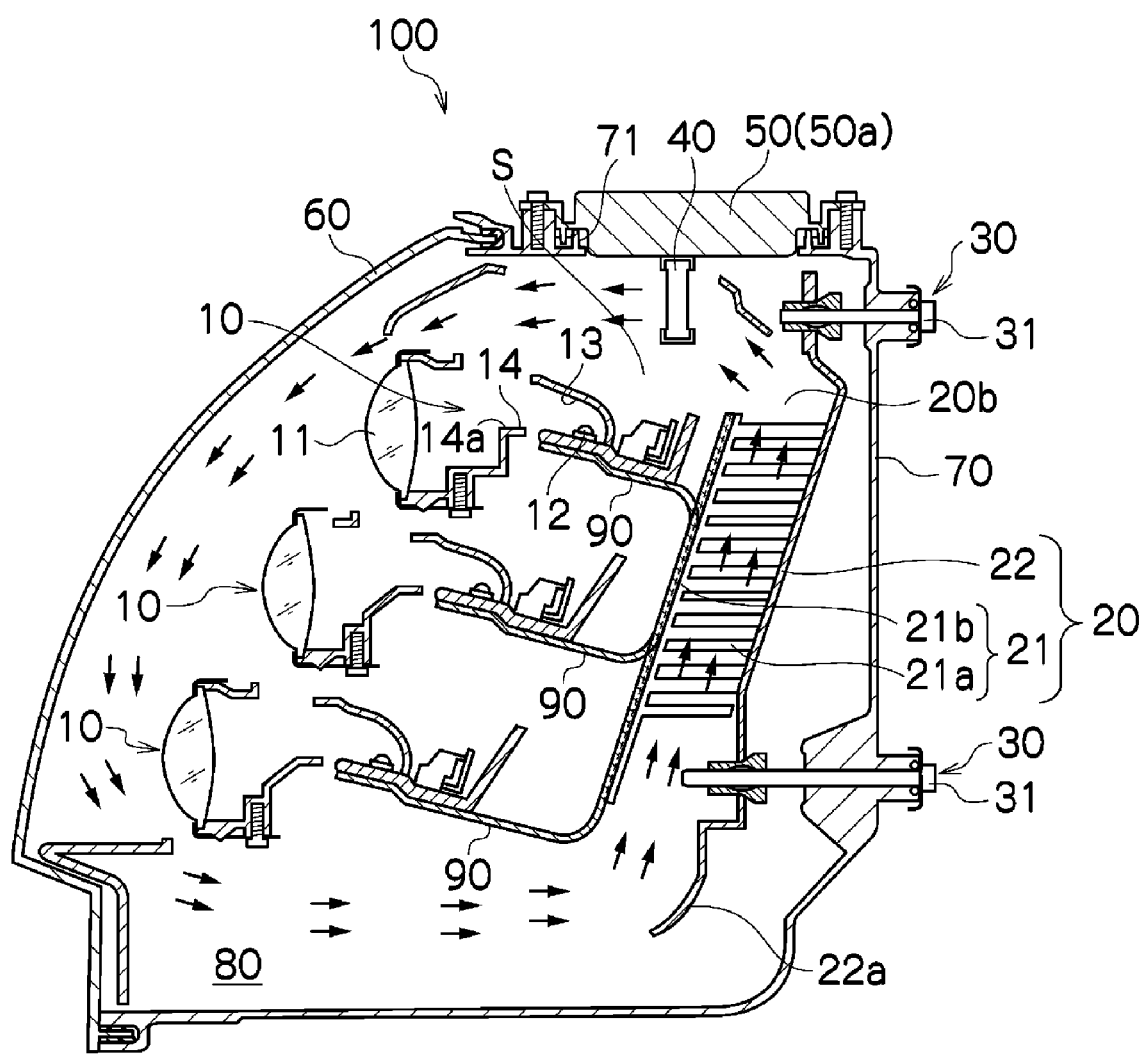
FIG. 6 is a longitudinal cross-sectional view illustrating still another modified example of the vehicle light of FIG. 2.

In the above exemplary embodiments, the axial fan motor 40 can be a fan having a built-in motor and can be disposed just below the lower end 20a of the duct 20. However, the presently disclosed subject matter is not limited to this configuration. For example, the axial fan motor 40 can be a fan with a built-in motor and can be disposed just above the upper end 20b of the duct 20 as shown in FIG. 6. In this case, the opening 71 for use in replacing an axial fan motor can be disposed on the upper surface of the housing 70 and can be covered with the cover member 50. Then, the axial fan motor 40 can be provided on the cover member 50 in an appropriate attitude. In the illustrated exemplary embodiment, the axial fan motor 40 is attached to the cover member 50 so as to be able to create an air flow that extends horizontally forward. Accordingly, the air inside the duct 20 is sucked by the axial fan motor 40 and is circulated.

In the above exemplary embodiments, the number of the LED light source units 10 is three, but the presently disclosed subject matter can include any number of LED light source units 10, for example, a single LED light source unit 10 or 2 or more LED light source units 10.

In the above exemplary embodiments, the LED light source units 10 are secured to the heat sink main body 21b as shown in FIG. 2, for example. However, the presently disclosed subject matter is not limited to these examples. For example, a base plate (not shown) can be disposed between the LED light source units 10 and the heat sink 21, and the LED light source units 10 and the heat sink main body 21b of the heat sink 21 can be secured to respective surfaces of the base plate with appropriate attachment structures or means. In this way, the LED light source units 10 can be secured in a reliable and strong manner.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle light comprising:
a lens cover;
a housing which together with the lens cover defines a light chamber;
at least one LED light source unit disposed within the light chamber, the LED light source unit having an optical axis;
a heat sink disposed within the light chamber, the heat sink including a heat sink main body, to which the LED light source unit is secured, and a plurality of heat dissipation fins;
a back plate disposed within the light chamber and separated from the heat sink main body at a specific distance, the back plate together with the heat sink forming a duct, wherein the plurality of heat dissipation fins are located in the duct and between the heat sink main body and the back plate;
an optical axis adjusting mechanism configured to move the duct so as to adjust the optical axis of the LED light source unit;
a heat conduction member disposed within the light chamber, the heat conduction member configured to conduct heat generated by the LED light source unit, when turned on, to the heat sink;
a fan disposed within the light chamber, the fan being configured to generate an air flow passing through the duct to circulate air within the light chamber; and
a cover member, the housing having an opening configured to allow removal and replacement of the fan with another fan, the cover member being detatchably attached to the housing so as to cover the opening of the housing, wherein the fan is disposed adjacent the opening and within the light chamber and at a position where the fan does not interfere with the duct when the duct is moved by the optical axis adjusting mechanism.

2. The vehicle light according to claim 1, further comprising:
a base plate disposed within the light chamber and having a first surface and a second surface, the LED light source unit being secured to the first surface, the heat sink being secured to the second surface.

3. The vehicle light according to claim 1, wherein the cover member includes a control circuit configured to control the LED light source unit.

4. The vehicle light according to claim 2, wherein the cover member includes a control circuit configured to control the LED light source unit.

5. The vehicle light according to claim 1, wherein the opening is provided in a bottom area of the housing, and the fan is attached to the cover member so that the fan, when operated, creates an upward air flow from below the duct.

6. The vehicle light according to claim 2, wherein the opening is provided in a bottom area of the housing, and the fan is attached to the cover member so that the fan, when operated, creates an upward air flow from below the duct.

7. The vehicle light according to claim 3, wherein the opening is provided in a bottom area of the housing, and the fan is attached to the cover member so that the fan, when operated, creates an upward air flow from below the duct.

8. The vehicle light according to claim 1, wherein the opening is provided in a bottom area of the housing, and the fan is attached to the cover member so that the fan, when operated, creates a horizontal air flow from below the duct.

9. The vehicle light according to claim 2, wherein the opening is provided in a bottom area of the housing, and the fan is attached to the cover member so that the fan, when operated, creates a horizontal air flow from below the duct.

10. The vehicle light according to claim 3, wherein the opening is provided in a bottom area of the housing, and the fan is attached to the cover member so that the fan, when operated, creates a horizontal air flow from below the duct.

11. The vehicle light according to claim 8, wherein the back plate has an extension from a lower end of the back plate, and the extension is configured to change the horizontal air flow to an upward air flow passing through the duct.

12. The vehicle light according to claim 9, wherein the back plate has an extension from a lower end of the back plate, and the extension is configured to change the horizontal air flow to an upward air flow passing through the duct.

13. The vehicle light according to claim 10, wherein the back plate has an extension from a lower end of the back plate, and the extension is configured to change the horizontal air flow to an upward air flow passing through the duct.

14. The vehicle light according to claim 1, wherein
the back plate has an extension from a lower end of the back plate;
the opening is located in a bottom area of the housing; and
the fan is attached to the extension of the back plate and is located adjacent the opening so that the fan, when operated, creates an upward air flow passing through the duct.

15. The vehicle light according to claim 2, wherein
the back plate has an extension from a lower end of the back plate;
the opening is located in a bottom area of the housing; and
the fan is attached to the extension of the back plate and is located adjacent the opening so that the fan, when operated, creates an upward air flow passing through the duct.

16. The vehicle light according to claim 3, wherein
the back plate has an extension from a lower end of the back plate;
the opening is located in a bottom area of the housing; and
the fan is attached to the extension of the back plate and is located adjacent the opening so that the fan, when operated, creates an upward air flow passing through the duct.

17. The vehicle light according to claim 1, wherein the opening is located in a top area of the housing, and the fan is attached to the cover member so that the fan, when operated, creates a horizontal air flow configured to suck air from within the duct.

18. The vehicle light according to claim 2, wherein the opening is located in a top area of the housing, and the fan is attached to the cover member so that the fan, when operated, creates a horizontal air flow configured to suck air from within the duct.

19. The vehicle light according to claim 3, wherein the opening is located in a top area of the housing, and the fan is attached to the cover member so that the fan, when operated, creates a horizontal air flow configured to suck air from within the duct.

20. The vehicle light according to claim 1, wherein the heat conduction member is a heat pipe.

21. The vehicle light according to claim 2, wherein the heat conduction member is a heat pipe.

22. The vehicle light according to claim 3, wherein the heat conduction member is a heat pipe.

23. The vehicle light according to claim 5, wherein the heat conduction member is a heat pipe.

24. The vehicle light according to claim 8, wherein the heat conduction member is a heat pipe.

25. The vehicle light according to claim 11, wherein the heat conduction member is a heat pipe.

26. The vehicle light according to claim 14, wherein the heat conduction member is a heat pipe.

27. The vehicle light according to claim 17, wherein the heat conduction member is a heat pipe.

28. The vehicle light according to claim 1, wherein the fan is an axial fan motor.

* * * * *